(12) United States Patent
Zheng et al.

(10) Patent No.: US 12,467,651 B2
(45) Date of Patent: Nov. 11, 2025

(54) TEMPERATURE ADJUSTMENT DEVICE, CONTROL METHOD THEREFOR, CONTROL APPARATUS THEREOF, AND STORAGE MEDIUM

(71) Applicants: GD Midea Heating & Ventilating Equipment Co., Ltd., Foshan (CN); Midea Group Co., Ltd., Foshan (CN)

(72) Inventors: Chunyuan Zheng, Shanghai (CN); Bin Luo, Shanghai (CN); Yunxiao Ding, Shanghai (CN); Dongdong Li, Shanghai (CN); Fangcheng Guo, Shanghai (CN); Bin Li, Shanghai (CN); Jintong Wu, Shanghai (CN)

(73) Assignees: GD Midea Heating & Ventilating Equipment Co., Ltd., Foshan (CN); Midea Group Co., Ltd., Foshan (CN)

( * ) Notice: Subject to any disclaimer, the term of this patent is extended or adjusted under 35 U.S.C. 154(b) by 458 days.

(21) Appl. No.: 17/992,803

(22) Filed: Nov. 22, 2022

(65) Prior Publication Data

US 2023/0085102 A1    Mar. 16, 2023

Related U.S. Application Data

(63) Continuation of application No. PCT/CN2021/122364, filed on Aug. 30, 2021.

(30) Foreign Application Priority Data

Dec. 8, 2020 (CN) .......................... 202011443905.8
Dec. 8, 2020 (CN) .......................... 202011445825.6

(51) Int. Cl.
*F24F 11/80* (2018.01)
*F24F 11/63* (2018.01)
*F24F 11/83* (2018.01)

(52) U.S. Cl.
CPC .............. *F24F 11/63* (2018.01); *F24F 11/80* (2018.01); *F24F 11/83* (2018.01); *G05B 2219/2614* (2013.01)

(58) Field of Classification Search
CPC . F24F 11/63; F24F 11/80; F24F 11/83; G05B 2219/2614
See application file for complete search history.

(56) References Cited

U.S. PATENT DOCUMENTS

| | | | |
|---|---|---|---|
| 2013/0086929 A1* | 4/2013 | Senf, Jr. .................. | F25B 47/02 62/80 |
| 2016/0054018 A1 | 2/2016 | Motodani et al. | |
| 2020/0124308 A1 | 4/2020 | Ota et al. | |

FOREIGN PATENT DOCUMENTS

| | | |
|---|---|---|
| CN | 104567162 A | 4/2015 |
| CN | 107062515 A | 8/2017 |

(Continued)

OTHER PUBLICATIONS

Midea Group Co., Ltd., Extended European Search Report and Supplementary Search Report, EP21902185.4, Nov. 9, 2023, 9 pgs.

(Continued)

*Primary Examiner* — Michael W Choi
(74) *Attorney, Agent, or Firm* — Morgan, Lewis & Bockius LLP

(57) ABSTRACT

A compressor return air dryness detection method includes: obtaining an exhaust air pressure, a return air pressure, a working frequency, an exhaust air temperature, and a return air temperature of a compressor; determining a return air saturation temperature corresponding to the return air pressure; calculating a temperature difference value based on the return air temperature and the return air saturation temperature; and in accordance with a determination that the temperature difference value is smaller than a predetermined threshold value, calculating a return air dryness of the (Continued)

compressor based on the exhaust air pressure, the return air pressure, the working frequency, and the exhaust air temperature.

7 Claims, 5 Drawing Sheets

(56) References Cited

FOREIGN PATENT DOCUMENTS

| CN | 107131117 | A | * | 9/2017 | ............. F04B 49/06 |
| CN | 107192097 | A | | 9/2017 | |
| CN | 109190799 | A | | 1/2019 | |
| CN | 109323398 | A | | 2/2019 | |
| CN | 109654003 | A | * | 4/2019 | ............. F04B 39/02 |
| CN | 109764586 | A | | 5/2019 | |
| CN | 110716141 | A | | 1/2020 | |
| CN | 110925942 | A | | 3/2020 | |
| CN | 111520883 | A | | 8/2020 | |
| CN | 111865267 | A | | 10/2020 | |
| EP | 3351862 | A1 | | 7/2018 | |
| EP | 3604954 | A1 | | 2/2020 | |

OTHER PUBLICATIONS

Midea Group Co., Ltd., WO, PCT/CN2021/122364, Dec. 13, 2021, 5 pgs.
Midea Group Co., Ltd., Iprp, PCT/CN2021/122364, Jun. 13, 2023, 6 pgs.
Midea Group Co., Ltd., CN Office Action, CN Patent Application No. 202011445825.6, Oct. 21, 2022, 15 pgs.
Midea Group Co., Ltd., ISR, PCT/CN2021/122364, Dec. 13, 2021, 2 pgs.

* cited by examiner

TEMPERATURE ADJUSTMENT DEVICE, CONTROL METHOD THEREFOR, CONTROL APPARATUS THEREOF, AND STORAGE MEDIUM

CROSS-REFERENCE TO RELATED APPLICATIONS

This application is a continuation of PCT Patent Application No. PCT/CN2021/122364, filed Aug. 30, 2021, which claims priority to Chinese Patent Application No. 202011443905.8, filed Dec. 8, 2020, and Chinese Patent Application No. 202011445825.6, filed Dec. 8, 2020, all of which are incorporated herein by reference.

FIELD

The present disclosure relates to the technical field of air conditioning, and more particularly, to a compressor return air dryness detection method, a compressor return air dryness detection apparatus, a compressor return air dryness detection device, and a storage medium.

BACKGROUND

The global warming coefficient (GWP) value of R32 refrigerant is 675, which is 68% lower than the GWP value 2088 of R410a refrigerant. R32 refrigerant has greatly improved environmental friendliness, and is widely used in air conditioners. However, the adiabatic coefficient of R32 refrigerant is high, and the exhaust air temperature in refrigeration compression cycle is 10 to 20° C. higher than that in R410a cycle. Among the various kinds of technologies for lowering the exhaust air temperature, the liquid-carrying return air technology can solve a problem of high exhaust air temperature without increasing hardware cost. However, the return air dryness cannot be measured, and if the return air dryness is too small, the compressor refrigerant oil will be diluted and abnormal wear of the compressor will be caused, which will reduce the reliability of the compressor.

The above content is only used to assist in understanding the technical solution of the present disclosure, and does not mean that the above content is acknowledged as the prior art.

SUMMARY

The present disclosure provides a compressor return air dryness detection method. The method includes: obtaining an exhaust air pressure, a return air pressure, a working frequency, an exhaust air temperature, and a return air temperature of a compressor; determining a return air saturation temperature corresponding to the return air pressure; calculating a temperature difference value based on the return air temperature and the return air saturation temperature; and calculating, in accordance with a determination that the temperature difference value is smaller than a predetermined threshold value, a return air dryness of the compressor based on the exhaust air pressure, the return air pressure, the working frequency, and the exhaust air temperature.

In some embodiments, the compressor return air dryness detection method further includes, subsequent to said calculating the temperature difference value based on the return air temperature and the return air saturation temperature: determining a predetermined return air dryness as the return air dryness of the compressor in accordance with a determination that the temperature difference value is greater than or equal to the predetermined threshold value.

In some embodiments, calculating the return air dryness of the compressor based on the exhaust air pressure, the return air pressure, the working frequency, and the exhaust air temperature includes: determining an exhaust air enthalpy value based on the exhaust air pressure and the exhaust air temperature; calculating a compression ratio based on the exhaust air pressure and the return air pressure, and determining a theoretical enthalpy difference based on the compression ratio; determining an absolute thermal efficiency of the compressor based on the exhaust air pressure, the return air pressure, and the working frequency; and calculating the return air dryness of the compressor based on the exhaust air enthalpy value, the theoretical enthalpy difference, the absolute thermal efficiency of the compressor, and the return air pressure.

In some embodiments, calculating the return air dryness of the compressor based on the exhaust air enthalpy value, the theoretical enthalpy difference, the absolute thermal efficiency of the compressor, and the return air pressure includes: calculating a return air enthalpy value based on the exhaust air enthalpy value, the theoretical enthalpy difference, and the absolute thermal efficiency of the compressor; searching for a saturated liquid enthalpy value and a saturated air enthalpy value that correspond to the return air pressure; and calculating the return air dryness of the compressor based on the saturated liquid enthalpy value, the saturated air enthalpy value, and the return air enthalpy value.

In some embodiments, calculating the return air dryness of the compressor based on the saturated liquid enthalpy value, the saturated air enthalpy value, and the return air enthalpy value includes: calculating, based on the saturated liquid enthalpy value, the saturated air enthalpy value, and the return air enthalpy value, the return air dryness of the compressor in accordance with a predetermined return air dryness formula:

$$X = (Ht7 - Hpe\_liq)/(Hpe\_gas - Hpe\_liq),$$

where x represents the return air dryness of the compressor, Ht7 represents the return air enthalpy value, Hpe_liq represents the saturated liquid enthalpy value, and Hpe_gas represents the saturated air enthalpy value.

In some embodiments, the compressor return air dryness detection method further includes, subsequent to said calculating, in response to the temperature difference value being smaller than the predetermined threshold value, the return air dryness of the compressor based on the exhaust air pressure, the return air pressure, the working frequency, and the exhaust air temperature: generating an adjustment strategy based on the return air dryness; and adjusting an operation state of the compressor based on the adjustment strategy, to control the return air dryness of the compressor within a predetermined return air dryness interval.

In some embodiments, said obtaining the exhaust air pressure, the return air pressure, the working frequency, the exhaust air temperature, and the return air temperature of the compressor includes: detecting the exhaust air pressure of the compressor by an exhaust air pressure sensor, and detecting the return air pressure of the compressor by a return air pressure sensor; detecting the exhaust air temperature of the compressor by an exhaust air temperature sensor, and detecting the return air temperature of the compressor by a return air temperature sensor; and obtaining a rotational speed of the compressor, and determining the working frequency of the compressor based on the rotational speed of the compressor.

The present disclosure further provides a compressor return air dryness detection apparatus. The compressor return air dryness detection apparatus includes: a data obtaining module configured to obtain an exhaust air pressure, a return air pressure, a working frequency, an exhaust air temperature, and a return air temperature of a compressor; a data searching module configured to determine a return air saturation temperature corresponding to the return air pressure; a temperature difference value module configured to calculate a temperature difference value based on the return air temperature and the return air saturation temperature; and a return air dryness module configured to calculate, in accordance with a determination that the temperature difference value is smaller than a predetermined threshold value, a return air dryness of the compressor based on the exhaust air pressure, the return air pressure, the working frequency, and the exhaust air temperature.

The present disclosure further discloses a compressor return air dryness detection device. The compressor return air dryness detection device includes a memory; a processor; and a compressor return air dryness detection program stored on the memory and executable on the processor. The compressor return air dryness detection program, when executed by the processor, implements steps of the compressor return air dryness detection method as described above.

The present disclosure further provides a storage medium. The storage medium has a compressor return air dryness detection program stored thereon. The compressor return air dryness detection program, when executed by a processor, implements steps of the compressor return air dryness detection method as described above.

In some embodiments, the exhaust air pressure, the return air pressure, the working frequency, the exhaust air temperature, and the return air temperature of the compressor may be obtained; the return air saturation temperature corresponding to the return air pressure is determined; the temperature difference value is calculated based on the return air temperature and the return air saturation temperature; and the return air dryness of the compressor is calculated based on the exhaust air pressure, the return air pressure, the working frequency, and the exhaust air temperature in response to the temperature difference value being smaller than the predetermined threshold value. In some embodiments, the return air saturation temperature corresponding to the return air pressure is determined based on the return air pressure, the temperature difference value is calculated based on the return air temperature and the return air saturation temperature, and the return air dryness of the compressor may calculated based on the exhaust air pressure, the return air pressure, the working frequency, and the exhaust air temperature in accordance with a determination that the temperature difference value is smaller than the predetermined threshold value. In this way, the return air dryness of the compressor may be accurately calculated and the accuracy of the detection of the return air dryness of the compressor may be improved.

The realization of the purpose, functional features and advantages of the present disclosure will be further explained in connection with the embodiments with reference to the accompanying drawings.

DETAILED DESCRIPTION

It should be understood that the specific embodiments described herein are intended to be explanatory only and are not intended to limit the present disclosure.

Figure 1:
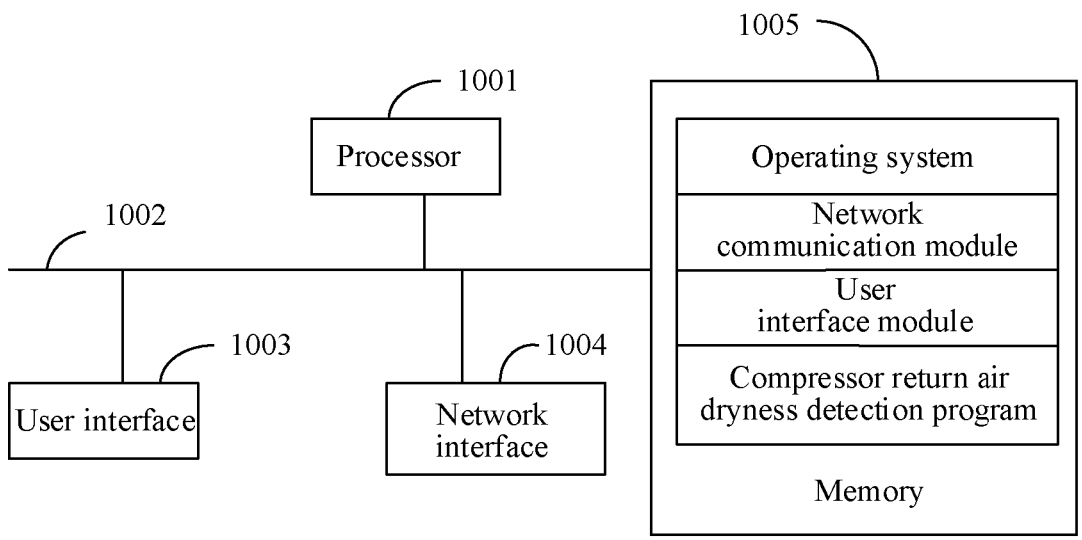
FIG. 1 is a schematic structural diagram illustrating a compressor return air dryness detection device in a hardware operation environment according to an embodiment of the present disclosure.

Reference is made to FIG. 1. FIG. 1 is a schematic structural diagram of a compressor return air dryness detection device in a hardware operating environment according to an embodiment of the present disclosure.

As shown in FIG. 1, the compressor return air dryness detection device may include a processor 1001, such as a Central Processing Unit (CPU), a communication bus 1002, a user interface 1003, a network interface 1004, and a memory 1005. The communication bus 1002 is configured to realize connection and communication between these components. The user interface 1003 may include a display, and an input unit such as a key. The selectable user interface 1003 may further include a standard wired interface and a wireless interface. In some embodiments, the network interface 1004 may include a standard wired interface and a wireless interface (e.g., a WI-FI interface). The memory 1005 may be a high-speed Random Access Memory (RAM) memory, or a non-volatile memory such as a disk memory. In some embodiments, the memory 1005 may be a storage device independent of the processor 1001 described above.

Those skilled in the art will appreciate that the device configuration shown in FIG. 1 does not constitute a limitation on the compressor return air dryness detection device. The compressor return air dryness detection device may include more or fewer components than illustrated, or a combination of certain components, or different component arrangements.

As shown in FIG. 1, the memory 1005 as a storage medium may include an operating system, a network communication module, a user interface module, and a compressor return air dryness detection program.

In the compressor return air dryness detection device shown in FIG. 1, the network interface 1004 is mainly configured to connect an external network and perform a data communication with other network devices. The user interface 1003 is mainly configured to connect a user device and perform a data communication with the user device. The device according to the present disclosure invokes the compressor return air dryness detection program stored in the memory 1005 through the processor 1001 and executes the compressor return air dryness detection method provided by the embodiment of the present disclosure.

Based on the above hardware structure, an embodiment of the compressor return air dryness detection method of the present disclosure is provided.

Figure 2:
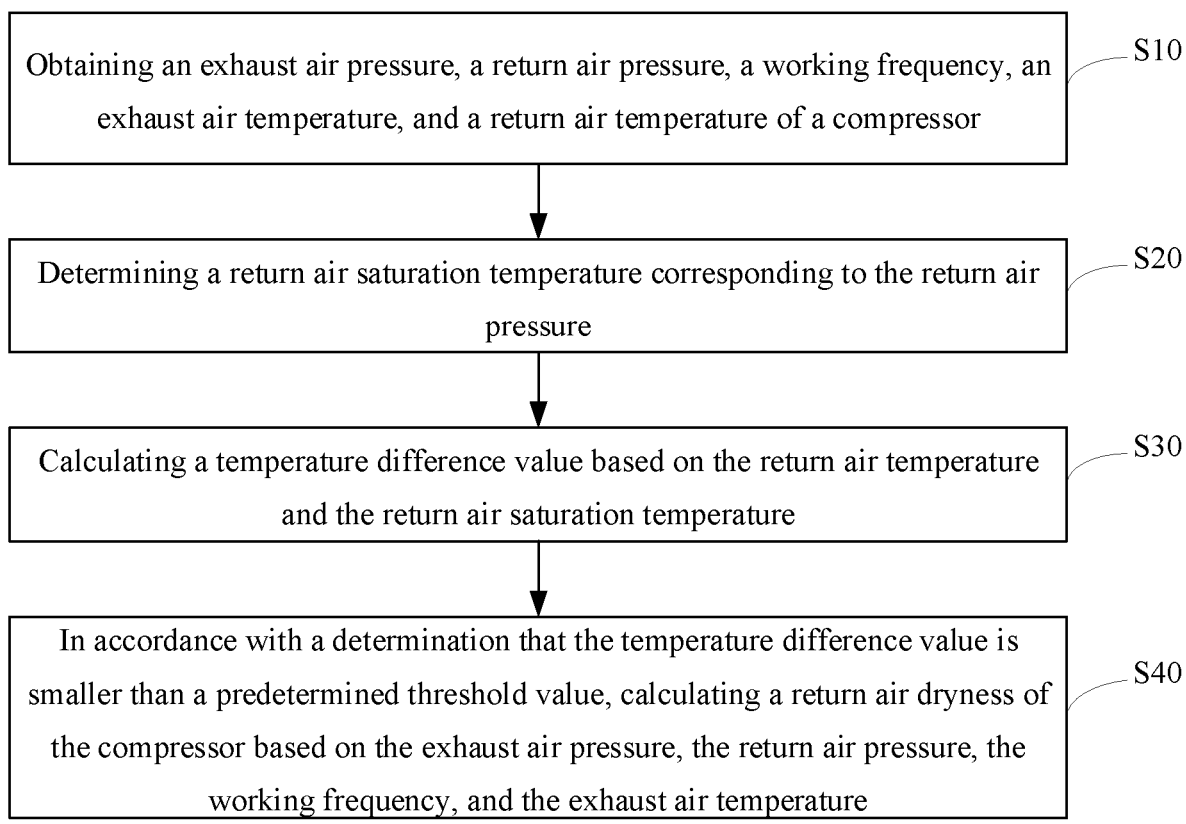
FIG. 2 is a flowchart illustrating a first embodiment of a compressor return air dryness detection method according to the present disclosure.

Reference is made to FIG. 2. FIG. 2 is a flowchart illustrating a first embodiment of a compressor return air dryness detection method according to the present disclosure.

In the first embodiment, the compressor return air dryness detection method includes the following steps.

At step S10, an exhaust air pressure, a return air pressure, a working frequency, an exhaust air temperature, and a return air temperature of a compressor are obtained.

It should be noted that an executive entity of this embodiment may be a compressor return air dryness detection device, such as a computer device, or other devices capable of realizing the same or similar functions. This embodiment is not limited to this, and the computer device will be described as an example in this embodiment.

Figure 3:
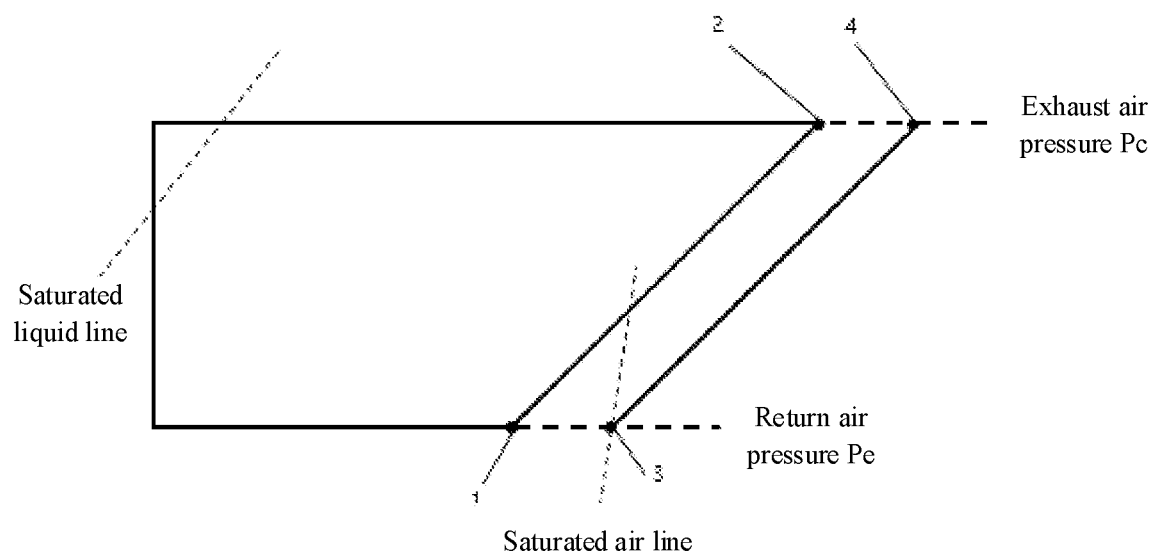
FIG. 3 is a pressure enthalpy diagram of a refrigeration compression cycle, where the suctioned air carries liquid, of a compressor return air dryness detection method according to an embodiment of the present disclosure.

It should be understood that as shown in FIG. 3, FIG. 3 is a pressure enthalpy diagram of a refrigeration compression cycle, where the suctioned air carries liquid, where 3-4 represents a compression process of return air saturation. However, due to the physical properties of R32 refrigerant, the temperature of an exhaust air temperature point 4 will be 10 to 20° C. higher than that of R410a cycle, and may exceed a reliable operation range of a compressor under some working conditions, resulting in carbonization and cracking of refrigerant oil of the compressor, thus reducing lubrication effect and causing abnormal wear or even damage to the compressor. One of the solutions commonly used is a liquid-carrying return air control of a process 1-2 as shown in the figure, which can effectively lower the exhaust air temperature. However, it is very difficult to measure the amount of the liquid carried by the liquid-carrying return air, i.e., the dryness x of the return air. If the dryness is too small, a compressor liquid will be compressed and the compressor will be damaged.

It can be understood that the compressor is a compressor of an air conditioner. When the compressor is in a working state, the exhaust air pressure, return air pressure, working frequency, exhaust air temperature, and return air temperature of the compressor can be obtained, and the return air dryness of the compressor can be detected through these compressor parameters.

Further, in order to obtain the compressor parameters more accurately, the step S10 includes: detecting the exhaust air pressure of the compressor by an exhaust air pressure sensor, and detecting the return air pressure of the compressor by a return air pressure sensor; detecting the exhaust air temperature of the compressor by an exhaust air temperature sensor, and detecting the return air temperature of the compressor by a return air temperature sensor; and obtaining a rotational speed of the compressor, and determining the working frequency of the compressor based on the rotational speed of the compressor.

It should be understood that the exhaust air pressure sensor, the return air pressure sensor, the exhaust air temperature sensor, and the return air temperature sensor can be set in advance, and an exhaust air pressure Pc can be detected by the exhaust air pressure sensor, a return air pressure Pe can be detected by the return air pressure sensor, an exhaust air temperature T7c can be detected by the exhaust air temperature sensor, and a return air temperature T7 can be detected by the return air temperature sensor.

It should be understood that the rotational speed of the compressor can also be detected and thus the rotational speed of the compressor is obtained; and then a working frequency INV of the compressor can be determined based on the rotational speed of the compressor.

At step S20, a return air saturation temperature corresponding to the return air pressure is determined.

It should be understood that return air saturation temperatures corresponding to various return air pressures are preset, and after a return air pressure is detected currently, a return air saturation temperature corresponding to the return air pressure can be determined.

In the specific implementation, a plurality of return air pressures to be selected and return air saturation temperatures to be selected can be obtained first. Here, the return air saturation temperatures to be selected are in one-to-one correspondence with the plurality of return air pressures to be selected. A mapping list is established based on the return air pressures to be selected and the return air saturation temperatures to be selected, and a corresponding relationship between the return air pressures to be selected and the return air saturation temperatures to be selected is recorded in the mapping list.

It can be understood that after the return air pressure Pe is detected, the return air pressure can be matched with a return air pressure to be selected in the mapping list, and a return air saturation temperature Te corresponding to the return air pressure Pe can be determined based on the matching result.

At step S30, a temperature difference value is calculated based on the return air temperature and the return air saturation temperature.

It should be understood that after the return air temperature and the return air saturation temperature are obtained, a magnitude relationship between the return air temperature and the return air saturation temperature can be obtained by comparison. In this embodiment, the magnitude relationship is determined by calculating the temperature difference value.

It can be understood that the temperature difference value can be calculated based on the return air temperature T7 and the return air saturation temperature Te, where the temperature difference value is expressed as T7−Te.

At step S40, a return air dryness of the compressor is calculated based on the exhaust air pressure, the return air pressure, the working frequency, and the exhaust air temperature in accordance with a determination that the temperature difference value is smaller than a predetermined threshold value.

It should be noted that the predetermined threshold value in this embodiment can be 1, and when the temperature difference value T7−TE is smaller than 1, it can be determined that the return air carries a liquid, a return air dryness calculation step under the condition of the return air carrying a liquid can be entered, and the return air dryness of the compressor can be calculated based on the exhaust air pressure, the return air pressure, the working frequency, and the exhaust air temperature.

Further, other than the case where the return air carries a liquid, there is a case where the return air carries no liquid, and the method further includes, after the step S30: determining a predetermined return air dryness as the return air dryness of the compressor in accordance with a determination that the temperature difference value being greater than or equal to the predetermined threshold value.

It should be understood that when the temperature difference value T7−TE is greater than or equal to 1, the return air can be determined to be purely gaseous without liquid, and the predetermined return air dryness can be determined as the return air dryness of the compressor, where the predetermined return air dryness can be set as 1. Therefore, when the return air is purely gaseous without liquid, the return air dryness x is 1.

Further, the return air dryness cannot be accurately measured in the related art, and if the return air dryness is too small, the refrigerant oil of the compressor will be diluted and abnormal wear of the compressor will be caused. In view of this, the method further includes, after the step S40: generating an adjustment strategy based on the return air dryness; and adjusting an operation state of the compressor based on the adjustment strategy, to control the return air dryness of the compressor within a predetermined return air dryness interval.

It should be understood that after the return air dryness is calculated through the above steps, the adjustment strategy can be generated based on the current return air dryness, and the operation state of the compressor can be adjusted based on the adjustment strategy. In this way, the return air dryness of the compressor can be controlled within a reasonable range and the reliability of the compressor can be improved. Here, the predetermined return air dryness interval is the reasonable range of the return air dryness, and a specific value thereof can be predetermined by technical personnel, which will not be limited in this embodiment.

According to this embodiment, the exhaust air pressure, the return air pressure, the working frequency, the exhaust air temperature, and the return air temperature of the compressor are obtained; the return air saturation temperature corresponding to the return air pressure is determined; the temperature difference value is calculated based on the return air temperature and the return air saturation temperature; and the return air dryness of the compressor is calculated based on the exhaust air pressure, the return air pressure, the working frequency, and the exhaust air temperature in accordance with a determination that the temperature difference value is smaller than the predetermined threshold value. In this embodiment, the return air saturation temperature corresponding to the return air pressure is determined based on the return air pressure, the temperature difference value is calculated based on the return air temperature and the return air saturation temperature, and the return air dryness of the compressor is calculated based on the exhaust air pressure, the return air pressure, the working frequency, and the exhaust air temperature in accordance with a determination that the temperature difference value is smaller than the predetermined threshold value. In this way, the return air dryness of the compressor can be accurately calculated and the accuracy of the detection of the return air dryness of the compressor can be improved.

Figure 4:
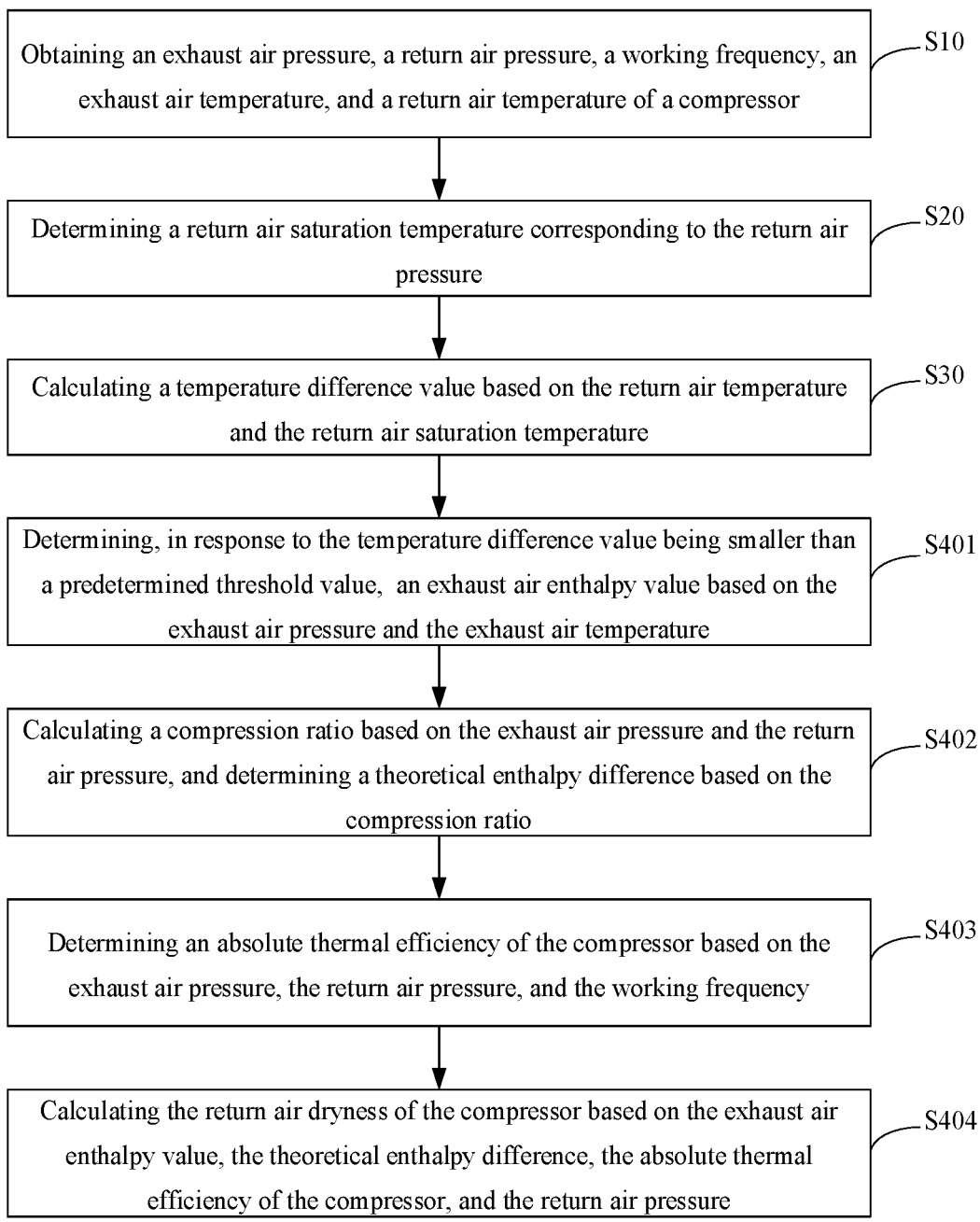
FIG. 4 is a flowchart illustrating a second embodiment of a compressor return air dryness detection method according to the present disclosure.

In an embodiment, as shown in FIG. 4, a second embodiment of the compressor return air dryness detection method according to the present disclosure is proposed based on the first embodiment. The step S40 includes the following steps.

At step S401, in accordance with a determination that the temperature difference value is smaller than a predetermined threshold value, an exhaust air enthalpy value is determined based on the exhaust air pressure and the exhaust air temperature.

It should be understood that when the temperature difference value T7−TE is smaller than 1, it can be determined that the return air carries a liquid, and the return air dryness calculation step in the case where the return air carries a liquid can be entered. First, the exhaust air enthalpy value $Ht7c$ of the exhaust air can be obtained through calculation based on the exhaust air pressure Pc and the exhaust air temperature $T7c$. The exhaust air enthalpy value can be calculated in accordance with the following formula:

$$Ht7c=f(pc,t7c),$$

where $Ht7c$ represents the exhaust air enthalpy value, Pc represents the exhaust air pressure, and $T7c$ represents the exhaust air temperature.

At step S402, a compression ratio is calculated based on the exhaust air pressure and the return air pressure, and a theoretical enthalpy difference is determined based on the compression ratio.

It should be understood that the compression ratio Pr may be calculated based on the exhaust air pressure Pc and the return air pressure Pe. The compression ratio can be calculated by the following formula:

$$Pr=Pc/Pe,$$

where Pr represents the compression ratio, Pc represents the exhaust air pressure, and Pe represents the return air pressure.

It can be understood that, after the compression ratio is obtained, the theoretical enthalpy difference $\Delta h$ can be further determined based on the compression ratio. The theoretical enthalpy difference can be calculated by the following formula:

$$\Delta h=f(Pr);$$

where $\Delta h$ represents the theoretical enthalpy difference, and Pr represents the compression ratio.

At step S403, an absolute thermal efficiency of the compressor is determined based on the exhaust air pressure, the return air pressure, and the working frequency.

It should be understood that the absolute thermal efficiency $\eta i$ of the compressor can be obtained through fitting based on the exhaust air pressure Pc, the return air pressure Pe, and the working frequency INV. The absolute thermal efficiency of the compressor can be calculated by the following formula:

$$\eta i=f(Pe,Pc,INV),$$

where $\eta i$ represents the absolute thermal efficiency of the compressor, Pe represents the return air pressure, Pc represents the exhaust air pressure, and INV represents the working frequency.

At step S404, the return air dryness of the compressor is calculated based on the exhaust air enthalpy value, the theoretical enthalpy difference, the absolute thermal efficiency of the compressor, and the return air pressure.

It should be understood that, after the exhaust air enthalpy value, the theoretical enthalpy value, and the absolute thermal efficiency of the compressor are obtained through calculation in accordance with the above steps, the return air dryness of the compressor can be calculated based on the exhaust air enthalpy value, the theoretical enthalpy difference, the absolute thermal efficiency of the compressor, and the return air pressure.

In this embodiment, the exhaust air enthalpy value is determined based on the exhaust air pressure and the exhaust air temperature; the compression ratio is calculated based on the exhaust air pressure and the return air pressure; the theoretical enthalpy difference is determined based on the compression ratio; the absolute thermal efficiency of the compressor is determined based on the exhaust air pressure, the return air pressure, and the working frequency; and the return air dryness of the compressor is calculated based on the exhaust air enthalpy value, the theoretical enthalpy difference, the absolute thermal efficiency of the compressor, and the return air pressure. In this way, the return air dryness of the compressor can be obtained accurately.

Figure 5:
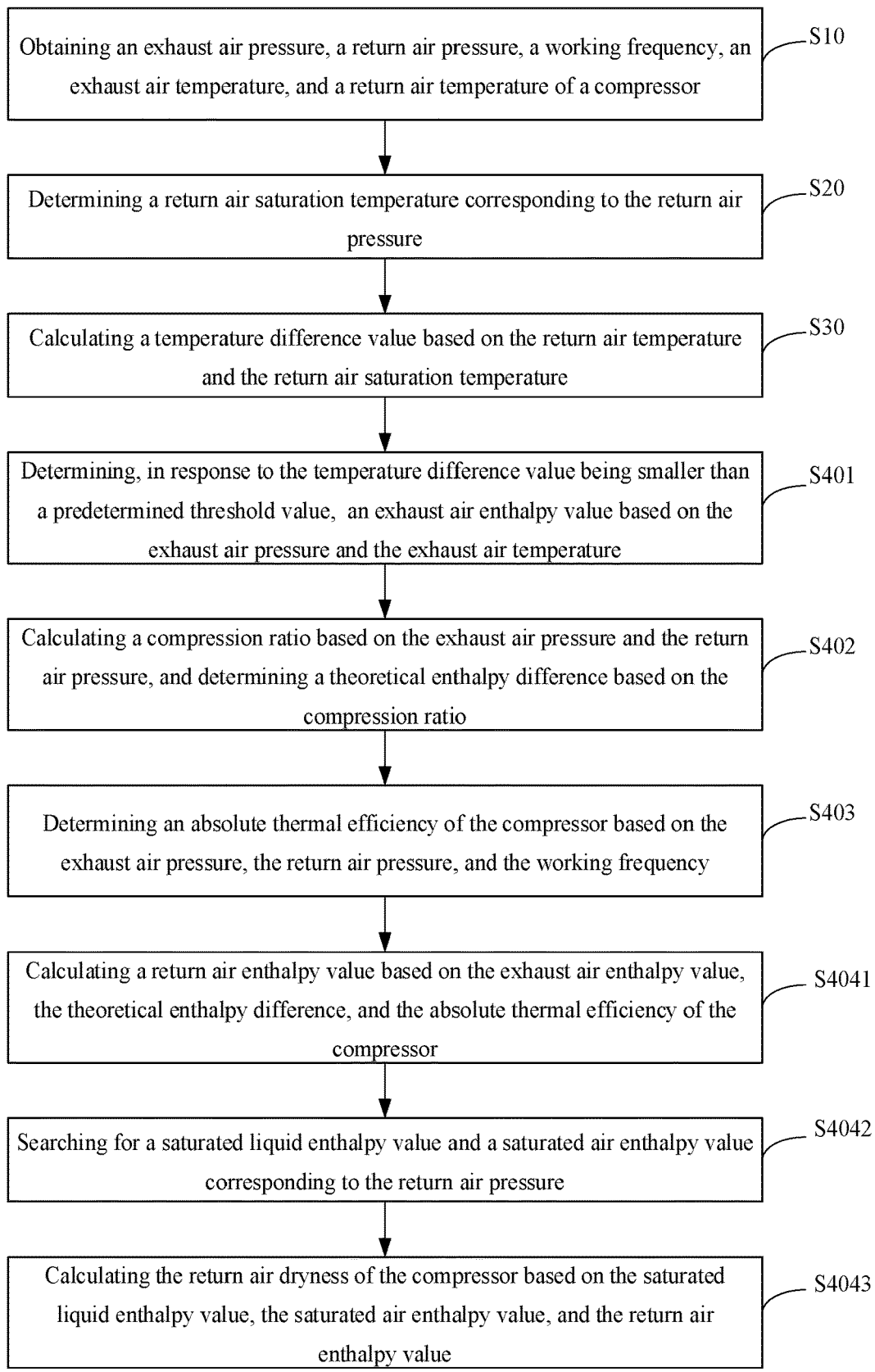
FIG. 5 is a flowchart illustrating a third embodiment of a compressor return air dryness detection method according to the present disclosure.

In an embodiment, as shown in FIG. 5, a third embodiment of a compressor return air dryness detection method according to the present disclosure is provided based on the first embodiment or the second embodiment. In this embodiment, the description is made based on the first embodiment, and the step S404 includes the following steps.

At step S4041, a return air enthalpy value is calculated based on the exhaust air enthalpy value, the theoretical enthalpy difference, and the absolute thermal efficiency of the compressor.

Figure 6:
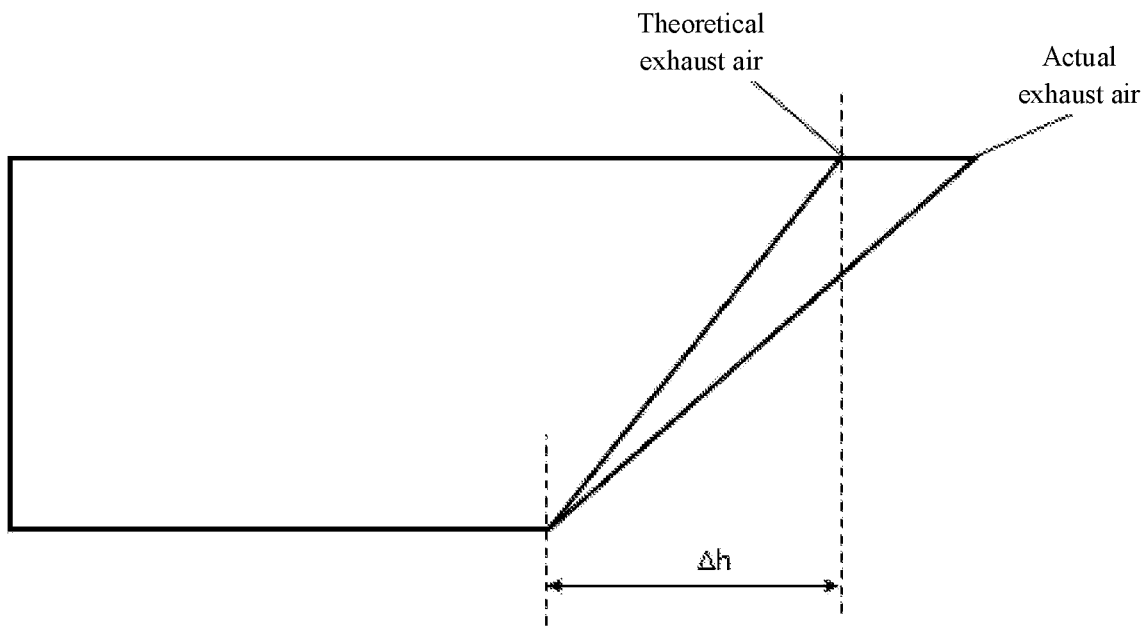
FIG. 6 is a schematic diagram illustrating an actual refrigeration compression cycle and a theoretical refrigeration compression cycle of a compressor return air dryness detection method according to an embodiment of the present disclosure.

It should be understood that the theoretical enthalpy difference is, under adiabatic compression, a value of the exhaust air enthalpy value minus the return air enthalpy value, as shown in FIG. 6. FIG. 6 is a schematic diagram illustrating an actual refrigeration compression cycle and a theoretical refrigeration compression cycle. Therefore, the return air enthalpy value Ht7 can be calculated based on the exhaust air enthalpy value Ht7c, the theoretical enthalpy difference Δh, and the absolute thermal efficiency qi of the compressor. The return air enthalpy value can be calculated by the following formula:

$$Ht7 = Ht7c - \Delta h/\eta i,$$

where Ht7 represents the return air enthalpy value, Ht7c represents the exhaust air enthalpy value, Δh represents the theoretical enthalpy difference, and qi represents the absolute thermal efficiency of the compressor.

At step S4042, a saturated liquid enthalpy value and a saturated air enthalpy value that correspond to the return air pressure are searched for.

It should be understood that after the return air enthalpy value is obtained through calculation, the return air dryness of the compressor can be further calculated based on the return air pressure and the return air enthalpy value.

It can be understood that the saturated liquid enthalpy value and saturated air enthalpy value corresponding to the return air pressure can be searched for, and the return air dryness of the compressor is calculated based on the saturated liquid enthalpy value, the saturated air enthalpy value, and the return air enthalpy value.

It should be understood that the saturated liquid enthalpy value Hpe_liq under the return air pressure can be searched for, and the saturated air enthalpy value Hpe_gas under the return air pressure can be searched for. The corresponding relationship between the saturated liquid enthalpy value and the return air pressure and the corresponding relationship between the saturated air enthalpy value and the return air pressure can be set in advance. Therefore, after the return air pressure is determined, the saturated liquid enthalpy value and the saturated air enthalpy value corresponding to the return air pressure can be determined through the return air pressure.

At step S4043, the return air dryness of the compressor is calculated based on the saturated liquid enthalpy value, the saturated air enthalpy value, and the return air enthalpy value.

It can be understood that after the saturated liquid enthalpy value and the saturated air enthalpy value are determined, the return air dryness of compressor can be calculated based on the saturated liquid enthalpy value, the saturated air enthalpy value, and the return air enthalpy value.

Further, said calculating the return air dryness of the compressor based on the saturated liquid enthalpy value, the saturated air enthalpy value, and the return air enthalpy value includes: calculating, based on the saturated liquid enthalpy value, the saturated air enthalpy value, and the return air enthalpy value, the return air dryness of the compressor in accordance with a predetermined return air dryness formula:

$$X = (Ht7 - Hpe\_liq)/(Hpe\_gas - Hpe\_liq),$$

where x represents the return air dryness of the compressor, Ht7 represents the return air enthalpy value, Hpe_liq represents the saturated liquid enthalpy value, and Hpe_gas represents the saturated air enthalpy value.

In this embodiment, the return air enthalpy value is calculated based on the exhaust enthalpy value, the theoretical enthalpy difference, and the absolute thermal efficiency of the compressor; the saturated liquid enthalpy value and saturated air enthalpy value corresponding to the return air pressure are searched for; and the return air dryness of the compressor is calculated based on the saturated liquid enthalpy value, the saturated air enthalpy value, and the return air enthalpy value. In this way, the return air enthalpy value is first calculated accurately, and then the return air dryness is calculated based on the return air enthalpy value, thus further improving the accuracy of the return air dryness.

In addition, an embodiment of the present disclosure also provides a storage medium. The storage medium has a compressor return air dryness detection program stored thereon. The compressor return air dryness detection program, when executed by a processor, implements steps of the compressor return air dryness detection method described above.

Since the storage medium adopts all the technical solutions of the above-mentioned embodiments, it has at least all the beneficial effects brought by the technical solutions of the above-mentioned embodiments, which will not be repeated here.

Figure 7:
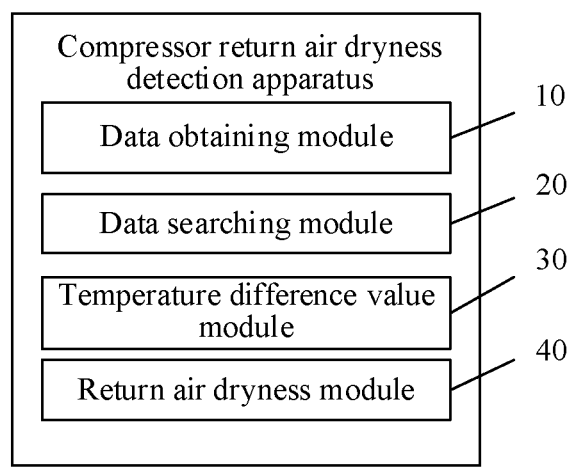
FIG. 7 is a functional module diagram of a first embodiment of a compressor return air dryness detection apparatus according to the present disclosure.

In addition, referring to FIG. 7, the embodiment of the present disclosure also provides a compressor return air dryness detection apparatus. The compressor return air dryness detection apparatus includes: a data obtaining module 10, a data searching module 20, a temperature difference value module 30, and a return air dryness module 40.

The data obtaining module 10 is configured to obtain an exhaust air pressure, a return air pressure, a working frequency, an exhaust air temperature, and a return air temperature of a compressor.

The data searching module 20 is configured to determine a return air saturation temperature corresponding to the return air pressure.

The temperature difference value module 30 is configured to calculate a temperature difference value based on the return air temperature and the return air saturation temperature.

The return air dryness module 40 is configured to calculate, in accordance with a determination that the temperature difference value is smaller than a predetermined threshold value, a return air dryness of the compressor based on the exhaust air pressure, the return air pressure, the working frequency, and the exhaust air temperature.

According to this embodiment, the exhaust air pressure, the return air pressure, the working frequency, the exhaust air temperature, and the return air temperature of the compressor are obtained; the return air saturation temperature corresponding to the return air pressure is determined; the temperature difference value is calculated based on the return air temperature and the return air saturation temperature; and the return air dryness of the compressor is calculated based on the exhaust air pressure, the return air pressure, the working frequency, and the exhaust air temperature in accordance with a determination that the temperature difference value is smaller than the predetermined threshold value. In this embodiment, the return air saturation temperature corresponding to the return air pressure is determined based on the return air pressure, the temperature difference value is calculated based on the return air temperature and the return air saturation temperature, and the return air dryness of the compressor is calculated based on the exhaust air pressure, the return air pressure, the working frequency, and the exhaust air temperature in accordance with a determination that the temperature difference value is smaller than the predetermined threshold value. In this way, the return air dryness of the compressor can be accurately calculated and the accuracy of the detection of the return air dryness of the compressor can be improved.

In an embodiment, the return air dryness module 40 is further configured to determine a predetermined return air dryness as the return air dryness of the compressor in accordance with a determination that the temperature difference value being greater than or equal to the predetermined threshold value.

In an embodiment, the return air dryness module 40 is further configured to determine an exhaust air enthalpy value based on the exhaust air pressure and the exhaust air temperature; calculate a compression ratio based on the exhaust air pressure and the return air pressure, and determining a theoretical enthalpy difference based on the compression ratio; determine an absolute thermal efficiency of the compressor based on the exhaust air pressure, the return air pressure, and the working frequency; and calculate the return air dryness of the compressor based on the exhaust air enthalpy value, the theoretical enthalpy difference, the absolute thermal efficiency of the compressor, and the return air pressure.

In an embodiment, the return air dryness module 40 is further configured to calculate a return air enthalpy value based on the exhaust air enthalpy value, the theoretical enthalpy difference, and the absolute thermal efficiency of the compressor, and calculate the return air dryness of the compressor based on the return air pressure and the return air enthalpy value.

In an embodiment, the return air dryness module 40 is further configured to search for a saturated liquid enthalpy value and a saturated air enthalpy value that correspond to the return air pressure, and calculate the return air dryness of the compressor based on the saturated liquid enthalpy value, the saturated air enthalpy value, and the return air enthalpy value.

In an embodiment, the return air dryness module 40 is further configured to calculate, based on the saturated liquid enthalpy value, the saturated air enthalpy value, and the return air enthalpy value, the return air dryness of the compressor in accordance with a predetermined return air dryness formula:

$$X = (Ht7 - Hpe\_liq)/(Hpe\_gas - Hpe\_liq),$$

where x represents the return air dryness of the compressor, Ht7 represents the return air enthalpy value, Hpe_liq represents the saturated liquid enthalpy value, and Hpe_gas represents the saturated air enthalpy value.

In an embodiment, the data obtaining module 10 is further configured to: detect the exhaust air pressure of the compressor by an exhaust air pressure sensor, and detect the return air pressure of the compressor by a return air pressure sensor; detect the exhaust air temperature of the compressor by an exhaust air temperature sensor, and detect the return air temperature of the compressor by a return air temperature sensor; and obtain a rotational speed of the compressor, and determine the working frequency of the compressor based on the rotational speed of the compressor.

In an embodiment, the compressor return air dryness detection apparatus further includes a compressor adjustment module configured to: generate an adjustment strategy based on the return air dryness; and adjust an operation state of the compressor based on the adjustment strategy, to control the return air dryness of the compressor within a predetermined return air dryness interval.

For other embodiments or specific implementations of the compressor return air dryness detection apparatus of the present disclosure, reference can be made to the above-mentioned method embodiments, which will not be repeated here.

It should be noted that herein, the terms "comprise", "include" or any other variants thereof are intended to cover non-exclusive inclusion, so that the process, method, article or device including a series of elements not only includes those elements, but also includes other elements that are not explicitly listed or also includes the inherent elements of the process, method, article or device. In the case that there are no more restrictions, an element defined by the statement "comprises/includes a" does not exclude the presence of additional identical elements in the process, method, article or device that comprises said element.

The above serial numbers of the embodiments of the present disclosure are for description only and do not represent the advantages or disadvantages of the embodiments.

According to the above description of the embodiments, it will be clear to those skilled in the art that the method of the above embodiments can be implemented by means of software plus the necessary common hardware platform, and of course alternatively by means of hardware, but in many cases the former is a preferred implementation. Based on this understanding, the technical solution of the present disclosure in essence or a part thereof that contributes to the related art can be implemented in the form of software products. The computer software product is stored in a computer-readable storage medium (e.g., ROM/RAM, magnetic disk, optical disk) as described above, including instructions for causing a smart device (which may be a mobile phone, a computer, a compressor return air dryness detection device, an air conditioner, or a network compressor return air dryness detection device, etc.) to perform the methods described in various embodiments of the present disclosure.

The above are only preferred embodiments of the present disclosure, and are not therefore limiting the scope of the present disclosure. Any equivalent structure or equivalent process transformation made by using the contents of the description and drawings of the present disclosure, or direct or indirect applications in other related technical fields are equally included in the claimed scope of the present disclosure.

What is claimed is:

1. A compressor return air dryness detection method, comprising:

obtaining an exhaust air pressure of a compressor, a return air pressure of the compressor, a working frequency of the compressor, an exhaust air temperature of the compressor, and a return air temperature of the compressor;

determining a return air saturation temperature corresponding to the return air pressure;

calculating a temperature difference value based on the return air temperature and the return air saturation temperature;

in accordance with a determination that the temperature difference value is smaller than a predetermined threshold value, calculating a return air dryness of the compressor based on the exhaust air pressure, the return air pressure, the working frequency, and the exhaust air temperature;

in accordance with a determination that the temperature difference value is greater than or equal to the predetermined threshold value, determining a predetermined return air dryness as the return air dryness of the compressor;

subsequent to the calculating, generating an adjustment strategy based on the return air dryness; and adjusting an operation state of the compressor based on the adjustment strategy, to control the return air dryness of the compressor within a predetermined return air dryness interval.

2. The compressor return air dryness detection method according to claim 1, wherein the calculating the return air dryness of the compressor based on the exhaust air pressure, the return air pressure, the working frequency, and the exhaust air temperature comprises:

determining an exhaust air enthalpy value based on the exhaust air pressure and the exhaust air temperature;

calculating a compression ratio based on the exhaust air pressure and the return air pressure, and determining a theoretical enthalpy difference based on the compression ratio;

determining an absolute thermal efficiency of the compressor based on the exhaust air pressure, the return air pressure, and the working frequency; and calculating the return air dryness of the compressor based on the exhaust air enthalpy value, the theoretical enthalpy difference, the absolute thermal efficiency of the compressor, and the return air pressure.

3. The compressor return air dryness detection method according to claim 2, wherein the calculating the return air dryness of the compressor based on the exhaust air enthalpy value, the theoretical enthalpy difference, the absolute thermal efficiency of the compressor, and the return air pressure comprises:

calculating a return air enthalpy value based on the exhaust air enthalpy value, the theoretical enthalpy difference, and the absolute thermal efficiency of the compressor;

searching for a saturated liquid enthalpy value and a saturated air enthalpy value that correspond to the return air pressure; and calculating the return air dryness of the compressor based on the saturated liquid enthalpy value, the saturated air enthalpy value, and the return air enthalpy value.

4. The compressor return air dryness detection method according to claim 3, wherein the calculating the return air dryness of the compressor based on the saturated liquid enthalpy value, the saturated air enthalpy value, and the return air enthalpy value comprises:

calculating, based on the saturated liquid enthalpy value, the saturated air enthalpy value, and the return air enthalpy value, the return air dryness of the compressor in accordance with a predetermined return air dryness formula:

$$X=(Ht7-Hpe\_liq)/(Hpe\_gas-Hpe\_liq),$$

where x represents the return air dryness of the compressor, Ht7 represents the return air enthalpy value, Hpe_liq represents the saturated liquid enthalpy value, and Hpe_gas represents the saturated air enthalpy value.

5. The compressor return air dryness detection method according to claim 1, wherein the obtaining the exhaust air pressure, the return air pressure, the working frequency, the exhaust air temperature, and the return air temperature of the compressor comprises:

detecting the exhaust air pressure of the compressor by an exhaust air pressure sensor, and detecting the return air pressure of the compressor by a return air pressure sensor;

detecting the exhaust air temperature of the compressor by an exhaust air temperature sensor, and detecting the return air temperature of the compressor by a return air temperature sensor; and obtaining a rotational speed of the compressor, and determining the working frequency of the compressor based on the rotational speed of the compressor.

6. A compressor return air dryness detection device, comprising:

a memory;

a processor; and a compressor return air dryness detection program stored on the memory and executable on the processor, the compressor return air dryness detection program comprising instructions that, when executed by the processor, cause the processor to perform operations of the compressor return air dryness detection method according to claim 1.

7. A non-transitory computer-readable storage medium, storing a compressor return air dryness detection computer program, when executed by a processor, cause the processor to perform operations comprising: obtaining an exhaust air pressure, a return air pressure, a working frequency, an exhaust air temperature, and a return air temperature of a compressor;

determining a return air saturation temperature corresponding to the return air pressure;

calculating a temperature difference value based on the return air temperature and the return air saturation temperature;

in accordance with a determination that the temperature difference value is smaller than a predetermined threshold value, calculating a return air dryness of the compressor based on the exhaust air pressure, the return air pressure, the working frequency, and the exhaust air temperature;

subsequent to calculating, generating an adjustment strategy based on the return air dryness; and adjusting an operation state of the compressor based on the adjustment strategy, to control the return air dryness of the compressor within a predetermined return air dryness interval.

* * * * *